United States Patent [19]

Lee et al.

[11] Patent Number: 5,850,508
[45] Date of Patent: Dec. 15, 1998

[54] METHOD OF PREVENTION OF DANGLING TRANSACTION OCCURRENCE USING A TRANSACTION TABLE INITIALIZATION TECHNIQUE AT AN ANALYSIS STEP

[75] Inventors: Jin Soo Lee; Jun Kim; Soon Young Park, all of Daejon; Young Chul Park, Daegu, all of Rep. of Korea

[73] Assignee: Electronics and Telecommunications Research Institute, Daejon, Rep. of Korea

[21] Appl. No.: 975,213

[22] Filed: Nov. 20, 1997

[30] Foreign Application Priority Data

Nov. 22, 1996 [KR] Rep. of Korea ............... 96-56393

[51] Int. Cl.$^6$ ................................................ G06F 11/14
[52] U.S. Cl. .................... 395/182.18; 395/182.14; 707/202; 364/285.2
[58] Field of Search .............. 395/182.18, 182.14, 395/182.13, 182.17, 182.11, 569, 591, 733; 707/201, 202, 203, 204, 1, 8, 10; 364/285.2, 285

[56] References Cited

U.S. PATENT DOCUMENTS

| | | | |
|---|---|---|---|
| 4,697,266 | 9/1987 | Finley ............................ | 395/182.14 |
| 4,945,474 | 7/1990 | Elliott et al. .................... | 395/182.14 |
| 5,043,866 | 8/1991 | Myre, Jr. et al. ................ | 707/202 |
| 5,280,611 | 1/1994 | Mohan et al. .................... | 395/182.18 |
| 5,333,303 | 7/1994 | Mohan ............................ | 395/182.18 |
| 5,638,508 | 6/1997 | Kanoi et al. .................... | 395/182.18 |
| 5,675,727 | 10/1997 | Watanabe ........................ | 395/182.18 |
| 5,721,918 | 2/1998 | Nilsson et al. .................. | 702/202 |
| 5,745,674 | 4/1998 | Lupton et al. ................... | 395/182.18 |
| 5,778,388 | 7/1998 | Kawamura et al. ................ | 707/203 |

FOREIGN PATENT DOCUMENTS

| | | | |
|---|---|---|---|
| 0236743 A2 | 9/1987 | European Pat. Off. ........ | G06F 11/14 |
| 0250847 A2 | 1/1988 | European Pat. Off. ........ | G06F 11/14 |
| 0295424 A2 | 12/1988 | European Pat. Off. ........ | G06F 11/14 |
| 0501160 A2 | 9/1992 | European Pat. Off. ....... | G06F 15/403 |

*Primary Examiner*—Dieu-Minh Le
*Attorney, Agent, or Firm*—Cohen, Pontani, Lieberman & Pavane

[57] ABSTRACT

A method for carrying out a check point for preventing a dangling transaction occurrence. The method uses a transaction table initialization technique performed during a recovery function. The method is performed by avoiding interruption of transactions occurring at the time the check point is carried out and is performed by reducing the amount of work required at the time of performing a recovery function from a failure detected in the transaction processing system. The occurrence of a dangling transaction is prevented by using a transaction table initialization technique at an analysis step for the transaction terminated between a time interval commencing when a check point start log record of a prior completed check point is logged and ending at a point of time when the check point end log record is logged.

3 Claims, 4 Drawing Sheets

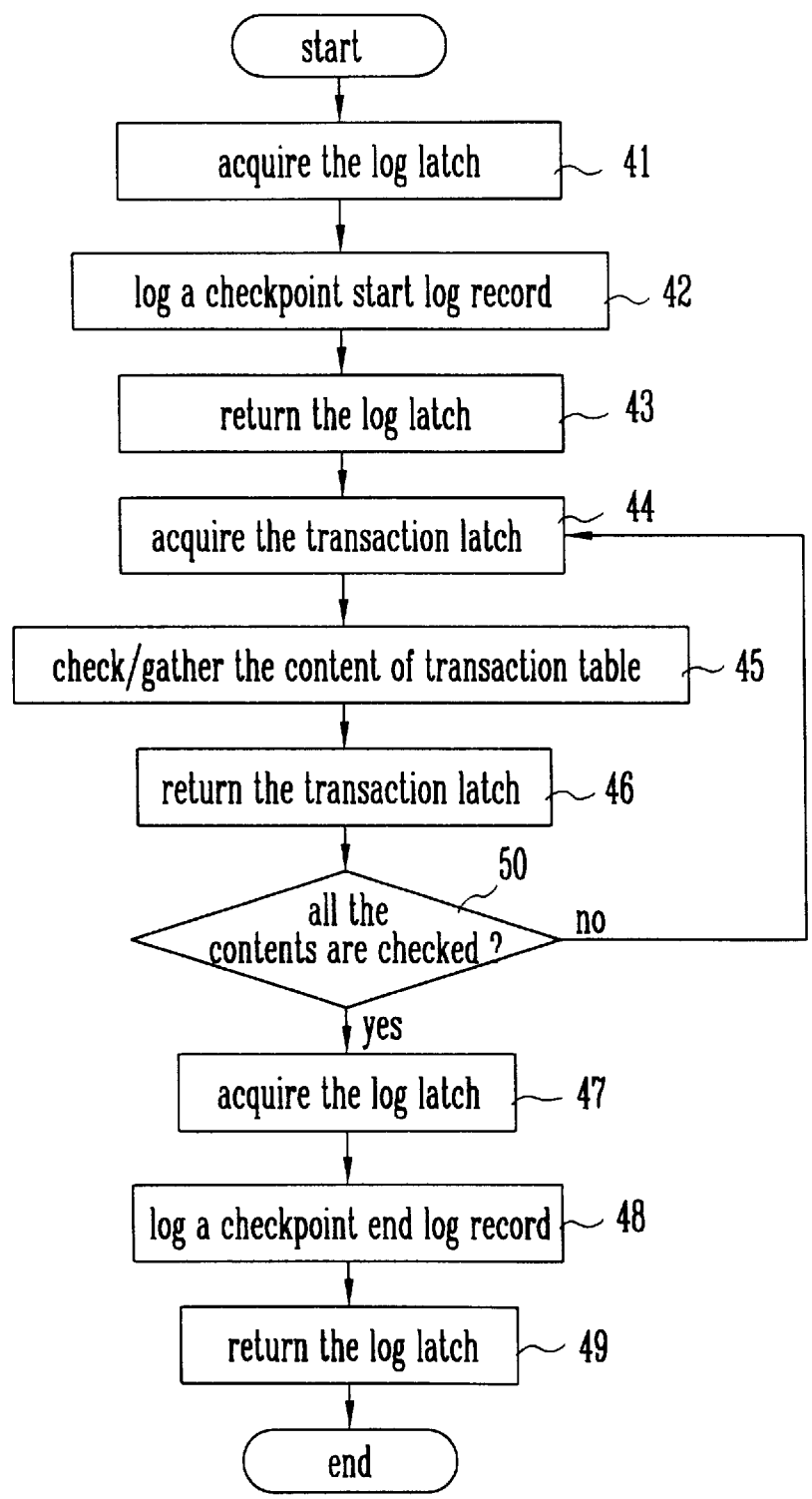

5,850,508

METHOD OF PREVENTION OF DANGLING TRANSACTION OCCURRENCE USING A TRANSACTION TABLE INITIALIZATION TECHNIQUE AT AN ANALYSIS STEP

BACKGROUND OF THE INVENTION

1. Field of the Invention

The present invention relates to a method of prevention of dangling transaction occurrence using a transaction table initialization technique at an analysis step and, in particular, to a recovery function from a system failure such as a power failure and a media failure such as a disk crash at a transaction processing system of a plurality of user environment.

The present invention is applied in carrying out a checkpoint to reduce an amount of work required for failure recovery, and particularly to a fuzzy checkpoint method, which is a method of enhancing a system performance by not interrupting other transactions even for a moment at the time of doing checkpoint.

2. Information Disclosure Statement

Among the conventional techniques which have been used in the present field, the transaction oriented checkpoint (TOC) method, transaction consistent checkpoint(TCC) method and action consistent checkpoint(ACC) method, etc. are methods in which while the checkpoints are carryied out, the performance of other transactions are interrupted, so they are exculded from consideration.

In a conventionally used fuzzy checkpoint method, errors are found that cancel a result of some transactions among already completed transactions, and these transactions are called dangling transactions. Error operation of this method will be described in detail below.

The fuzzy checkpoint is a method which asynchronously performs normal transactions and a checkpoint to improve the system performance. This method, first of all, records (logging) a checkpoint start log record at the time of carrying out the checkpoint, then finally records a checkpoint end log record after performing required operations, and updates/records master pages for supporting the recovery function thereby terminating the checkpoint process. The method checks a transaction table in the process of performing the checkpoint, collects the currently on-going (completion prepared state or completion not prepared state) transactions, writes the transactions on a transaction list of checkpoint end log record, and logs the log record. If the check operation of transaction table is performed without interleaving the normal transactions, the operation is precisely performed. However, in the fuzzy checkpoint, other cases can occur. For example, the performance of fuzzy checkpoint and the transaction $T\_i$ can cause interference as in a scenario shown below.

1. Checkpoint process logged the checkpoint start log record.
2. Checkpoint process checks the status of transaction $T\_i$ at transaction table, registers the transaction list, and thereafter checks the status of other transaction $T\_j$.
3. Since a context switching occurs, a process which performs transaction $T\_i$ is performed, and $T\_i$ logged the transaction end log record.
4. Checkpoint process resumes again, completes the checks of remaining entries at the transaction table to complete the checkpoint end log record, and records the log record to the log file.
5. Checkpoint process changes the pages.
6. Power failure occurred.

In the above example, the recovery function performance from the system failure(power failure) is as follows. First, at the analysis, log records are analysed from the checkpoint start log record of the last completed checkpoint, and if the transaction end log record of the transaction $T\_i$ is encountered the item of $T\_i$ is removed from the transaction table. Thereafter, if the checkpoint end log record is encountered, the item of $T\_i$ is registered again on the transaction table in the condition of $T\_i$(completion prepared condition or completion not prepared condition) written on the transaction list of the log record. The log record about the transaction $T\_i$ does not appear after the checkpoint end log record. Therefore, upon completion of the analysis step of recovery function, $T\_i$ is specified according to the status at the time when the checkpoint process checks the condition of $T\_i$ on the transaction table. $T\_i$ is specified as a transaction to be entirely rollbacked if the condition is completion not prepared condition, and as a completion prepared transaction if the condition is completion prepared condition. In case of being specified as a transaction to be entirely rollbacked, the transaction $T\_i$ is forcible aborted by undoing all undoable log records sequencially(in the order of opposite direction to the log)from the last log record of $T\_i$ which was checked at the time of performing the checkpoint at the undo step of recovery function. That is, the already terminated(completed or entirely rollbacked) transaction is cancelled from an intermediate state of the transaction or is made to be in completion prepared condition, therefore, the property of atomicity, consistency and durability of the transaction are not guaranteed. These transactions $T\_i$ are called dangling transactions, and an error exist that dangling transactions occur in conventional fuzzy checkpoint method.

SUMMARY OF THE INVENTION

Therefore, an object of the present invention is to provide a method of prevention of dangling transaction occurrence using a transaction table initialization technique at an analysis step to solve an error that dangling transactions occur in fuzzy checkpoint method which is a method of enhancing a system performance by not interrupting other transactions even for a moment at the time of doing checkpoint which is carryied out to reduce an amount of work required at the time of performing the recovery function from failure in the transaction processing system.

A method of prevention of dangling transaction occurrance using a transaction table initialization technique at an analysis step of the present invention to accomplish the above described object is characterized in that it comprises the steps of initializing the transaction table with the content of transaction list in the checkpoint end log record of the last completed checkpoint at an analysis step of recovery function; initializing as an empty condition an Overflow_Trans_list for temporarily storing the status of transaction when there is no empty entry in the transaction table; temporarily storing the status of transaction of current log record in Overflow_Trans_list, if no empty entry exists in the transaction table for the log record of the first appearing transaction; neglecting the transaction list in checkpoint end log record of incompleted checkpoint or completed checkpoint; and registering the content recorded in Overflow_Trans_list, if the Overflow_Trans_list is not empty at the last point of time at analysis step.

BRIEF DESCRIPTION OF THE DRAWINGS

For fuller understanding of the nature and object of the invention, reference should be had to the following detailed description taken in conjunction with the accompanying drawings in which:

FIG. 4 is a flow diagram of a checkpoint process in the transaction processing system to which the present invention is applied;

Similar reference characters refer to similar parts in the several views of the drawings.

DETAILED DESCRIPTION OF THE INVENTION

An embodiment of the present invention will be described below in detail with reference to the accompanying drawings.

Figure 1:
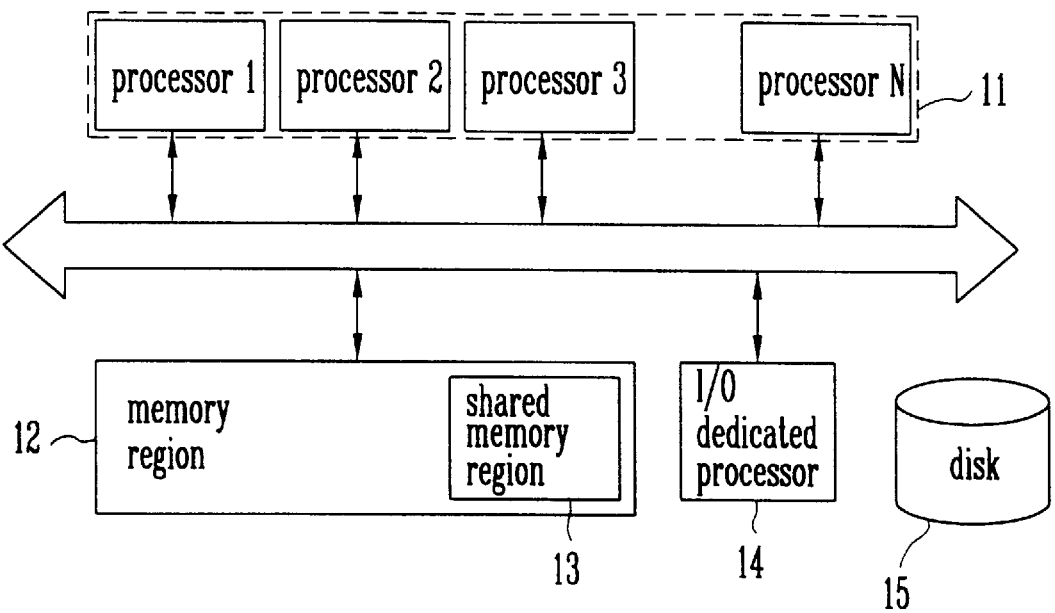
FIG. 1 is a structural drawing of a hardware to which the present invention is applied.

FIG. 1 is a structural drawing of a hardware to which the present invention is applied. In FIG. 1, Pi(1<=i=n)(11) denotes a processor, Mem(12) denotes a memory region of a main memory device, SM(13) denotes a shared memory region in the memory region 12, IOP(14) denotes an input/output dedicated processor, and DISK(15) denotes a disk which is an auxiliary memory device. As described above, the present invention can operate in a general hardware environment including a single processor or multi processor and a shared memory region.

Figure 2:
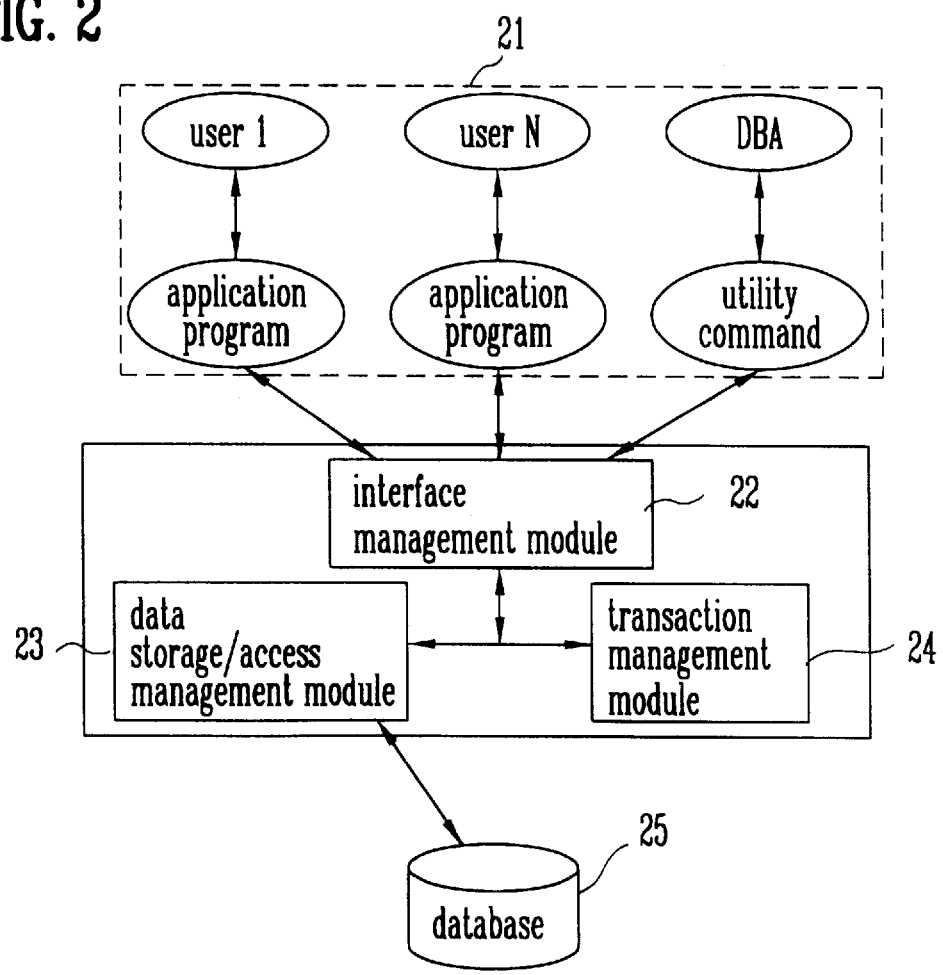
FIG. 2 is a structural drawing of a storage system module to which the present invention is applied.

FIG. 2 is a structural drawing of a transaction processing system module to which the present invention is applied. The module consists of an interface management module 22 which basically connects a user 21 and the system, a data storage/access management module 23 which generates and processes a database 25 in the disk, and a transaction management module 24 which takes charge of concurrency control and recovery of transaction.

Figure 3:
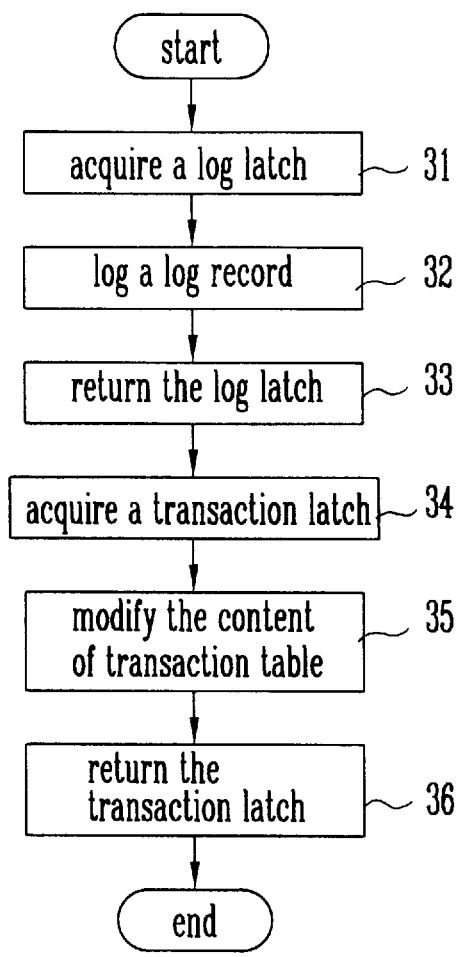
FIG. 3 is a flow diagram of logging operation of each transaction process in a transaction processing system to which the present invention is applied.

FIG. 3 shows only a logging operation part required for illustration of the present invention among the operation flow of transaction processes in the transaction processing system to which the present invention is applied. To record (log) the log record, a log latch which guarantees the integrity of this operation is acquired in exclusive mode at the step 31, logging is performed at step 32, the log latch is released(returned) at step 33. Thereafter, the result of this logging operation shall be reflected to a relevant portion of relevant entry of transaction table, and for this, first, a transaction latch which guarantees the integrity of the relevant transaction table entry is acquired in an exclusive mode at step 34, portions which requires modification in the entry is modified at step 35, and the transaction latch is released(returned) at step 36.

FIG. 4 is a flow diagram of operation of a checkpoint process in the transaction processing system to which the present invention is applied. Only the portions required to illustrate the present invention are shown. The checkpoint first logs a checkpoint start log record, checks the content of transaction table and compile the necessary contents to make a transaction list, and logs the transaction list by including it into a checkpoint end log record. When logging the checkpoint start log record, first, the log latch which guarantees the intergrity of logging operation is acquired in exclusive mode at step 41, the checkpoint start log record is logged at step 42, and the log latch is released(returned) at step 43. The procedure of making the transaction list performs the followings for each entry of the transaction table. First, the transaction latch which guarantees the integrity of relevant transaction table entry is acquired in exclusive mode at step 44, thereafter, the content in the entry is checked and necessary portions are compiled and registered in the transaction list at step 45, and the transaction latch is released(returned) at step 46. If all entries of the transaction table is checked and the checking is completed at step 50, the completed transaction list shall be included in the checkpoint end log record and logged. For this, first, the log latch which guarantees the integrity of logging operation is acquired in exclusive mode at step 47, the checkpoint end log record is logged at step 48, and the log latch is released (returned) at step 49.

Figure 5:
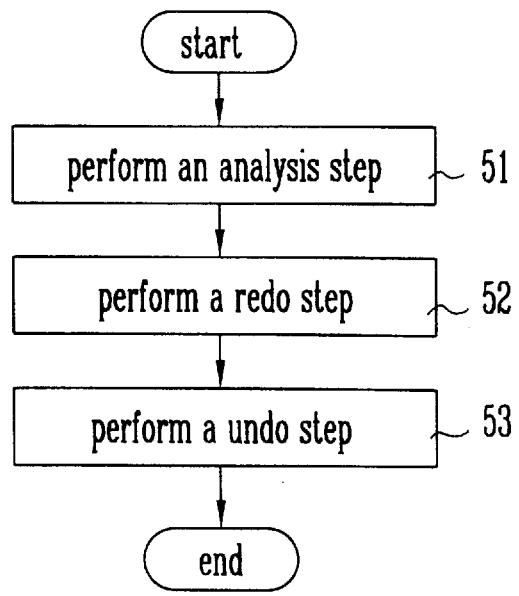
FIG. 5 is a flow diagram of operation of recovery function in the transaction processing system.

FIG. 5 is a flow diagram of the operation of recovery function in the transaction processing system to which the present invention is applied. The recovery function is performed in three steps, that is, an analysis step 51, REDO step 52, and UNDO step 53 in that order.

The first step performs the analysis step at step 51. The operations performed at the analysis step are, first, to decide a point(log record) to start the REDO step which is the next step, second, to decide the transactions which shall be cancelled at the UNDO step which is the last step and to register the transactions to the transaction table. These operations will be described below in detail. The log records recorded in the log file are sequentially read from the checkpoint start log record of the last completed checkpoint to the end of the log records, and during this reading, for each log record, if the transaction table entry corresponding to the current log record does not exist, an entry is made at the transaction table, and if the current log record is the transaction end log record, the corresponding entry is removed from the transaction table.

The second step performs the redo step at step 52. An identifier(RedoLSN) of the log record to start the redo step is decided as the result of the analysis step which is the previous step. The identifier has a value smaller than or equall to LSN(=Begin_ChkptLSN) of the checkpoint start log record of the last completed checkpoint start log record of the last completed checkpoint. In the redo step, the log records recorded in the log file are sequentially read starting from the identifier (RedoLSN) to the end of the log records, and during this reading, if each log record is redoable type, a corresponding operation is redone.

The third step performs the undo step at step 53. At this step, the transactions still remaining in the transaction table are rolled back.

Figure 6:
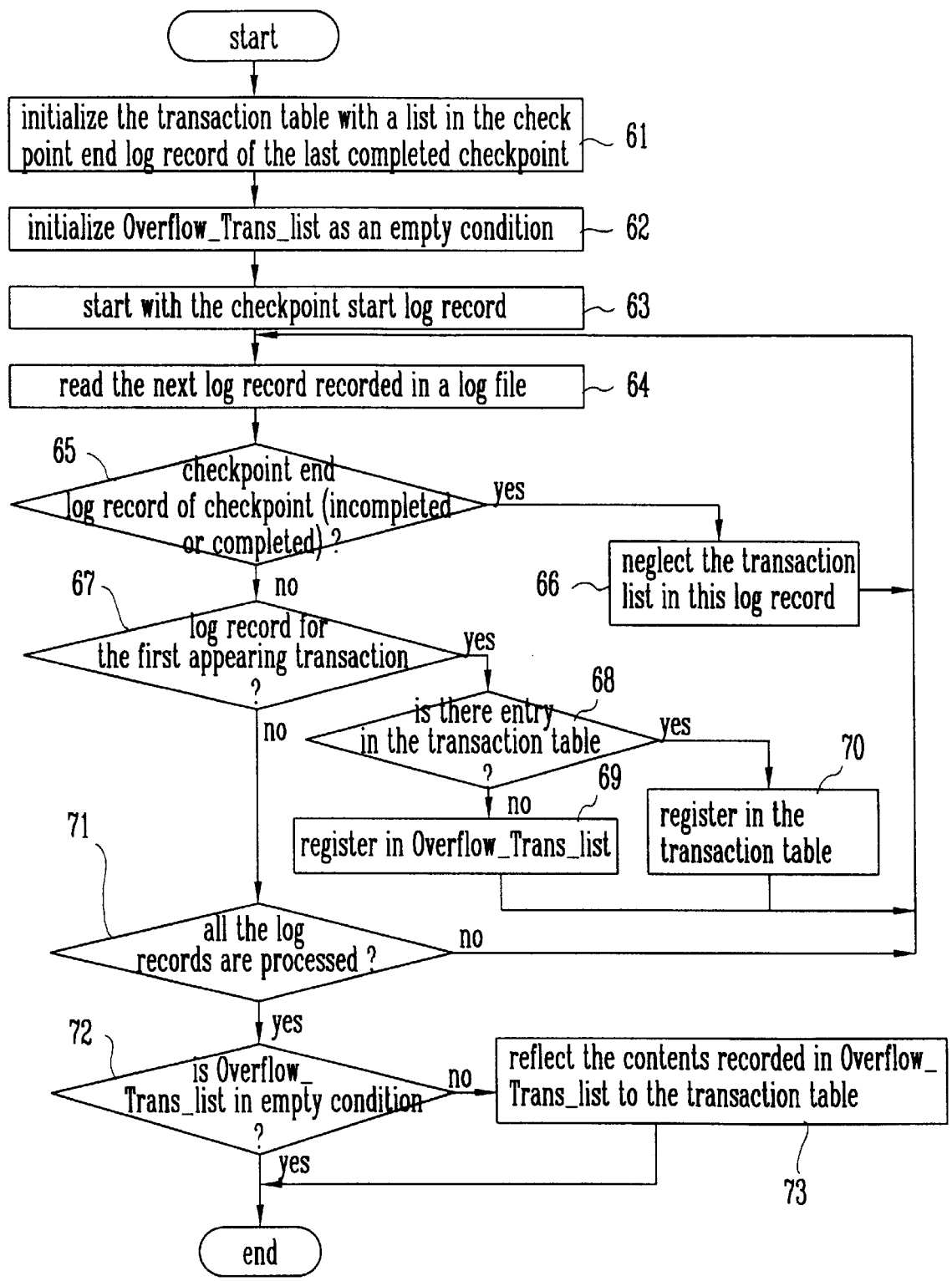
FIG. 6 is a flow diagram of operation at an analysis step of recovery function to which the present invention is applied.

FIG. 6 is a flow diagram of operation of analysis step among the recovery function in the transaction processing system to which the present invention is applied. Only the operation performed to remove the error that a dangling transaction occurs, which is a portion necessary for illustration of the present invention, is described in detail. Other portions are same as the description of FIG. 5.

First step; initialize the transaction table with the content of transaction list in the checkpoint end log record of the last completed checkpoint(step 61).

second step; initialize as an empty condition an Overflow_Trans_list for temporarily storing the performance condition of transaction when there is no empty entry in the transaction table(step 62).

Third step; sequentially read the log records recorded in the log file(step 64) starting from the checkpoint end log record of the last completed checkpoint(step 63) to the end of log records and perform the next step(step 65).

Fourth step; check whether the current log record is the checkpoint end log record of the incompleted checkpoint or the completed checkpoint(step 65), and if so, neglect the transaction list in that log record(step 66).

Fifth step; check whether the current log record is the log record of the first appearing transaction(step 67), and if so perform the next step(step 68).

Sixth step; if an empty entry exists in the transaction table, register the status of the transaction of the current log record in the empty entry of the transaction table(step 70). If the empty entry does not exist, store the status of the transaction of the current log record in the Overflow_Trans_list. Thereafter, re-perform the steps from the third step to process the next log record.

Seventh step; if in the step 5 the current log record is not the log record of the first appearing transaction, perform the next step(step 71). If no log record to be processed remains, perform the next step(step 72), and if the log record to be processed remains, re-perform the steps from the third step to process the remaining log record.

Eighth step; if the Overflow_Trans_list is not in the empty condition in the step(step 72), register the content recorded in the Overflow_Trans_list to the transaction table(step 73) and terminate, and if in empty condition, directly terminate.

In the conventional fuzzy checkpoint method, since the already terminated(completed or entirely rollbacked) transaction is rolled back from the interim state of transaction or made to be in the completion prepared condition, there is the error that property of atomicity, consistency and durability are not guaranteed, however, the error that such dangling transactions occur is removed through the present invention.

Effect of the Invention

The present invention described above obtains the following effects.

1. The advantages of fuzzy checkpoint method can be taken as they are. That is, the performance of transaction processing system can be enhanced by not interrupting other transactions even for a moment at the time of doing the checkpoint.

2. The dangling transaction which is the error occurring in the conventional fuzzy checkpoint method does not appear, so that the recovery from failure is precisely carried out by the fuzzy checkpoint method.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. A method for preventing a dangling transaction occurrence using a transaction table initialization technique at an analysis step of a recovery function, comprising the steps of:

a. initializing a transaction table with the content of a transaction list in a checkpoint end log record of the last completed checkpoint at the analysis step of a recovery function;

b. initializing as empty an Overflow_Trans_list for temporarily storing the performance condition of a transaction when there is no empty entry in the transaction table;

c. reading a next sequential one of log records recorded in a log file starting from the checkpoint end log record of the last completed checkpoint to an end of log records and determining whether the current log record is the checkpoint end log record of an incompleted checkpoint or a completed checkpoint;

d. neglecting the transaction list of the current log record if the current log record is the checkpoint end log record of the incompleted checkpoint or the completed checkpoint as the result of check in step c., and determining whether the current log record is the log record of the first appearing transaction if the current log record is not a checkpoint end log record in step c.;

e. determining whether all the log records are processed, if the current log record is not the log record of the first appearing transaction in step d. and determining whether an empty entry is in the transaction table if the current log record is the log record of the first appearing transaction in step d.;

f. registering the status of the transaction of the current log record in the empty entry of the transaction table if an empty entry exists in the transaction table in step e., and storing the status of the transaction of the current log record in the Overflow_Trans_list if an empty entry does not exist in the transaction table in step e., and g. repeating the steps c. thorough f. to process the next log record after step f.;

h. determining whether the Overflow_Trans_list is in empty condition if all the log records are processed in step e., and repeating the steps c–h to process the remaining log records if all the log records are not processed in step e.; and i. registering the content recorded in the Overflow_Trans_list to the transaction table and terminating the analysis step if the Overflow_Trans_list is not in the empty condition in step h. and directly terminating the analysis step if the Overflow_Trans_list is in the empty condition in step h.

2. The method of claim 1, wherein said step a. further comprises the steps of:

initializing the transaction table with the content of transaction list in the checkpoint end log record of the last completed checkpoint; and neglecting the transaction list in the checkpoint end log record of the last incompleted or completed checkpoint when searching the log record of log file.

3. The method of claim 1, wherein said step b. further comprises the steps of:

initializing the Overflow_Trans_list as an empty condition; and temporarily storing the status of the transaction of the current log record in the Overflow_Trans_list if there is no empty entry in the transaction table, for the log record of the first appearing transaction; and recording the content of the Overflow_Trans_list in the transaction table.

* * * * *